(12) United States Patent
Song et al.

(10) Patent No.: US 9,885,922 B2
(45) Date of Patent: Feb. 6, 2018

(54) DISPLAY DEVICE COMPRISING DAM PATTERN AND METHOD OF MANUFACTURING THE SAME

(71) Applicant: Samsung Display Co. Ltd., Yongin-si (KR)

(72) Inventors: Seung Ki Song, Suwon-si (KR); Joon Hyeong Kim, Cheonan-si (KR); Sung Hwan Bae, Asan-si (KR); Seung Hee Oh, Goyang-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/373,267

(22) Filed: Dec. 8, 2016

(65) Prior Publication Data

US 2017/0235168 A1    Aug. 17, 2017

(30) Foreign Application Priority Data

Feb. 17, 2016    (KR) ........................ 10-2016-0018667

(51) Int. Cl.
*G02F 1/1339*    (2006.01)
*G02F 1/1337*    (2006.01)

(52) U.S. Cl.
CPC .......... *G02F 1/1339* (2013.01); *G02F 1/1337* (2013.01)

(58) Field of Classification Search
CPC ............................ G02F 1/1339; G02F 1/1337
See application file for complete search history.

(56) References Cited

FOREIGN PATENT DOCUMENTS

| KR | 1020120039871 | 4/2012 |
|---|---|---|
| KR | 1020130080360 | 7/2013 |
| KR | 1020130142784 | 12/2013 |
| KR | 1020140062669 | 5/2014 |

*Primary Examiner* — Joseph L Williams
(74) *Attorney, Agent, or Firm* — Cantor Colburn LLP

(57) ABSTRACT

A display device includes a first substrate, on which a display region and a non-display region disposed outside the display region are defined; a first dam pattern and a second dam pattern, which are disposed on the first substrate in the non-display region. The first dam pattern includes a first stem section extending in a predetermined direction, and a first branch section and a second branch section extending to diverge from the first stem section, and the second dam pattern includes a second stem section disposed parallel to the first stem section, and a third branch section extending to diverge from the second stem section and facing the second branch section.

19 Claims, 18 Drawing Sheets

DISPLAY DEVICE COMPRISING DAM PATTERN AND METHOD OF MANUFACTURING THE SAME

This application claims priority to Korean Patent Application No. 10-2016-0018667, filed on Feb. 17, 2016, and all the benefits accruing therefrom under 35 U.S.C. §119, the content of which in its entirety is herein incorporated by reference.

BACKGROUND

1. Field

Embodiments of the invention relate to a display device and a method for manufacturing the display device.

2. Description of the Related Art

Importance of display devices has increased with the development of multimedia. Accordingly, various types of display devices, such as a liquid crystal display ("LCD") and an organic light emitting display device ("OLED"), have been widely used.

Among various types of display devices, the LCD device is one of the most widely used types of flat panel display devices, and typically includes two substrates provided with field-generating electrodes such as a pixel electrode and a common electrode, and a liquid crystal layer interposed therebetween. The LCD device generates an electric field to the liquid crystal layer by applying voltage to the field generating electrodes, and displays an image by determining the directions of liquid crystal molecules of the liquid crystal layer and by controlling the polarization of incident light.

The LCD device generally includes a display region in which an image is displayed, and a non-display region in which various signal lines are disposed so that the display region displays an image. Recently, the non-display region tends to gradually become narrower for achieving an LCD having a thin or narrow bezel.

SUMMARY

In a liquid crystal display ("LCD") device having a thin or narrow bezel, due to a narrow space of the non-display region, an arrangement problem of various wires and an interference problem from the display region may occur.

An embodiment of the invention provides a display device having thin bezel.

Another embodiment of the invention provides a display device with improved adhesion between upper and lower substrates.

Still another embodiment of the invention provides a method for manufacturing a display that effectively prevents a defect that may occur by overflowing of an alignment film in a process of manufacturing.

According to an embodiment of the invention, a display device includes a first substrate, on which a display region, and a non-display region disposed outside the display region are defined; a first dam pattern disposed on the first substrate in the non-display region, where the first dam pattern includes a first stem section extending in a predetermined direction, and a first branch section and a second branch section extending to diverge from the first stem section; and a second dam pattern disposed on the first substrate in the non-display region, where the second dam pattern includes a second stem section disposed parallel to the first stem section, and a third branch section extending to diverge from the second stem section and facing the second branch section.

In an embodiment, the first branch section and the second branch section may extend in a direction perpendicular to the predetermined direction.

In an embodiment, the first branch section and the second branch section may be alternately disposed with each other along the predetermined direction.

In an embodiment, the display device may further include a first alignment film disposed on the first dam pattern, and the first alignment film may at least partially overlap the first dam pattern.

In an embodiment, the first alignment film may overlap the first stem section, the first branch section and the second branch section.

In an embodiment, a space may be defined between the second branch section and the third branch section, and the first alignment film may cover at least a part of the space.

In an embodiment, the display device may further include a seal pattern disposed in the non-display region.

In an embodiment, the seal pattern may at least partially overlap the second dam pattern.

In an embodiment, the seal pattern may completely cover the second stem section and the third branch section.

In an embodiment, the display device may further include a first alignment film disposed on the first dam pattern, and a part of a lower surface of the seal pattern may be in contact with the first alignment film.

In an embodiment, an area of the part of the lower surface of the seal pattern in contact with the first alignment film may be smaller than about a half of an entire area of the lower surface of the seal pattern.

In an embodiment, the second dam pattern may be disposed between the seal pattern and the display region.

In an embodiment, the display region may have a rectangular outer circumference, and the first dam pattern and the second dam pattern may be disposed adjacent to at least one of the four outer sides of the outer circumference of the display region.

In an embodiment, the second stem section and the third stem section may be linearly aligned with each other.

In an embodiment, the second dam pattern may further include a fourth stem section which extends to diverge from the second stem section.

In an embodiment, the third stem section and the fourth stem section may be linearly aligned with each other.

According to another embodiment of the invention, a method for manufacturing a display device includes: preparing a first substrate on which a display region and a non-display region disposed outside the display region are defined; and providing a first dam pattern and a second dam pattern on the first substrate in the non-display region. In such an embodiment, the first damp pattern includes a first stem section extending in a predetermined direction, a first branch section extending to diverge from the first stem section and a second branch section extending to diverge from the first stem section, and the second dam pattern includes a second stem section disposed parallel to the first stem section, and a third branch section extending to diverge from the second stem section and facing the second branch section.

In an embodiment, the method may further include providing a first alignment film on the first dam pattern to at least partially overlap the first dam pattern.

In an embodiment, the method may further include providing a seal pattern on the second dam pattern to at least partially overlap the second dam pattern.

According to embodiments of the invention, a display device having thin or narrow bezel may be effectively achieved by reducing the non-display region thereof.

In such embodiments, the alignment film may be effectively prevented from reducing the adhesion performance of the seal pattern by being provided to overlap, e.g., overflowing to, the seal region of the display device.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION

Figure 1:
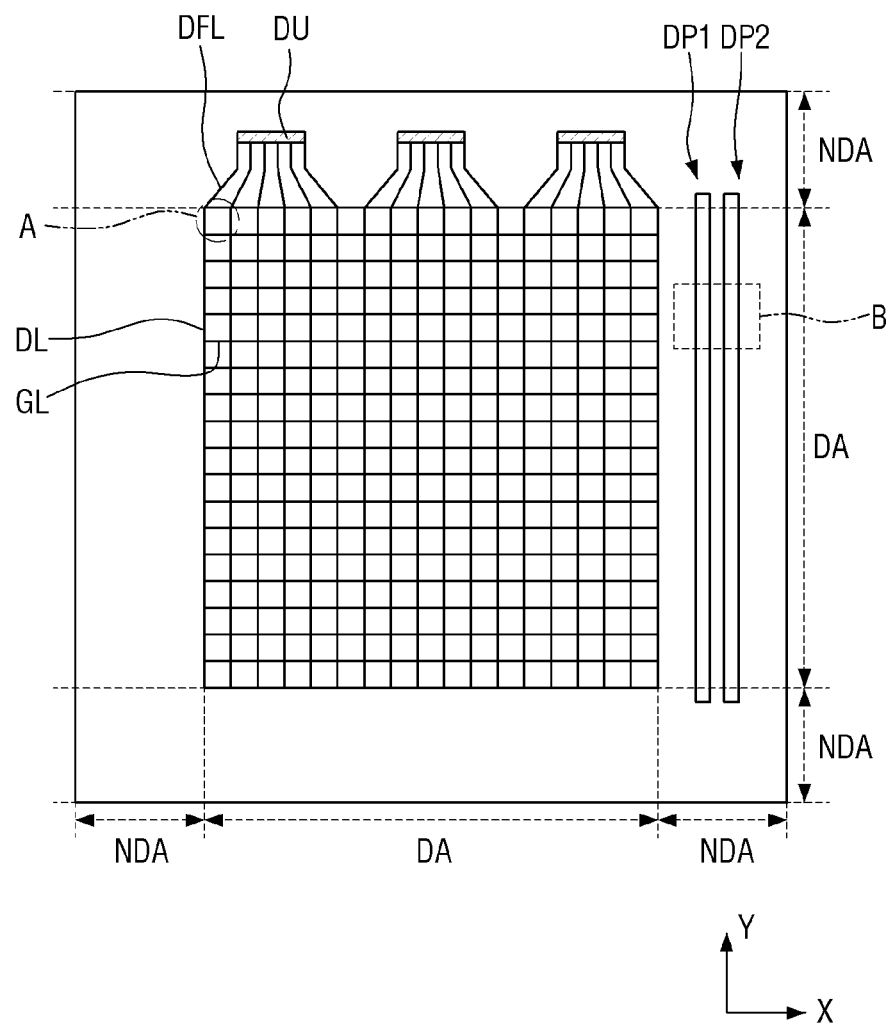
FIG. 1 is a schematic diagram of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the attached drawings.

Figure 2:
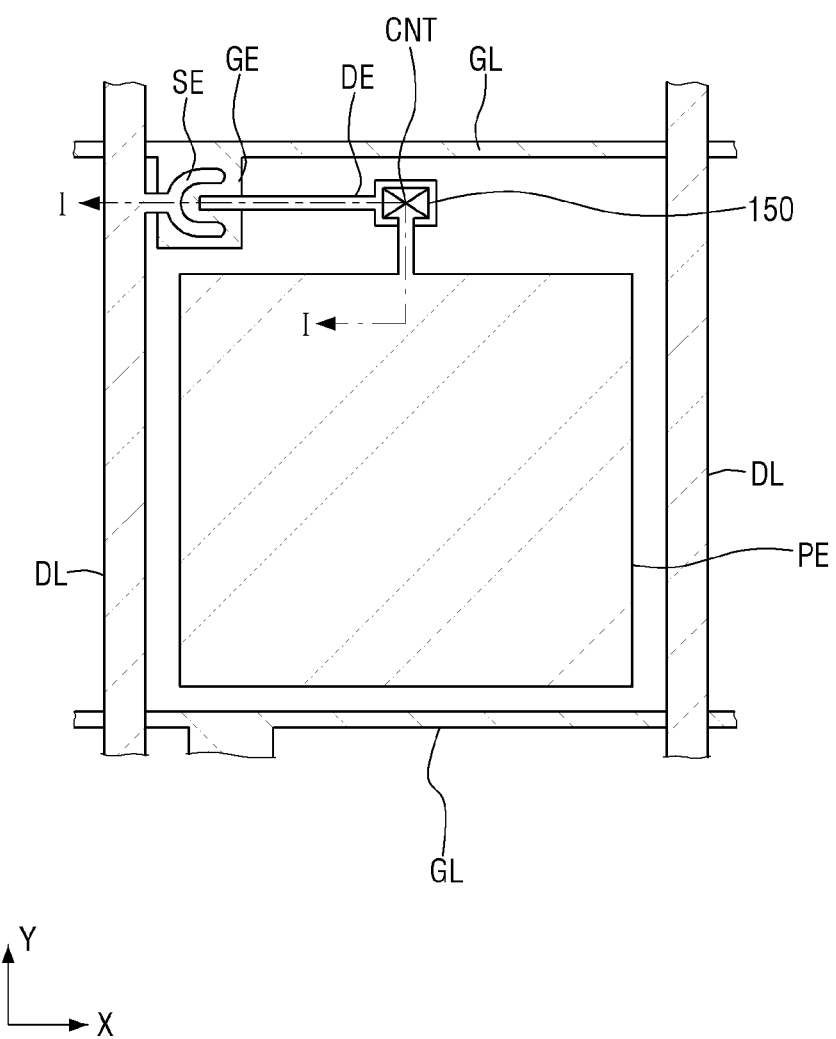
FIG. 2 is an enlarged view of a region "A" of FIG. 1.
Figure 3:
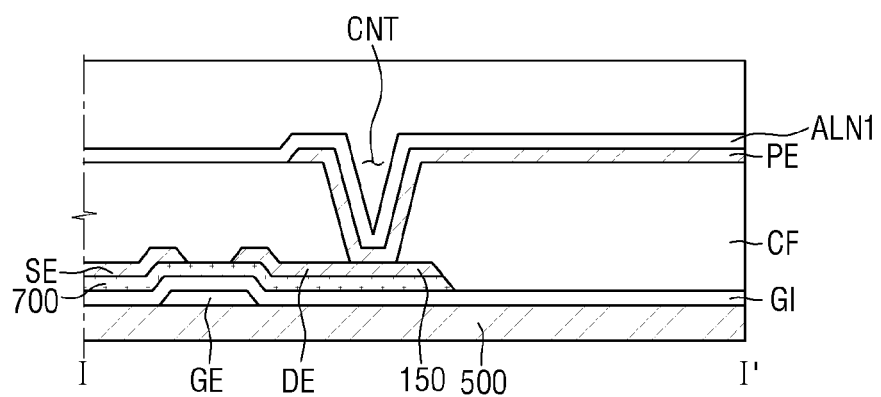
FIG. 3 is a cross-sectional view taken along line I-I' of FIG. 2.
Figure 4:
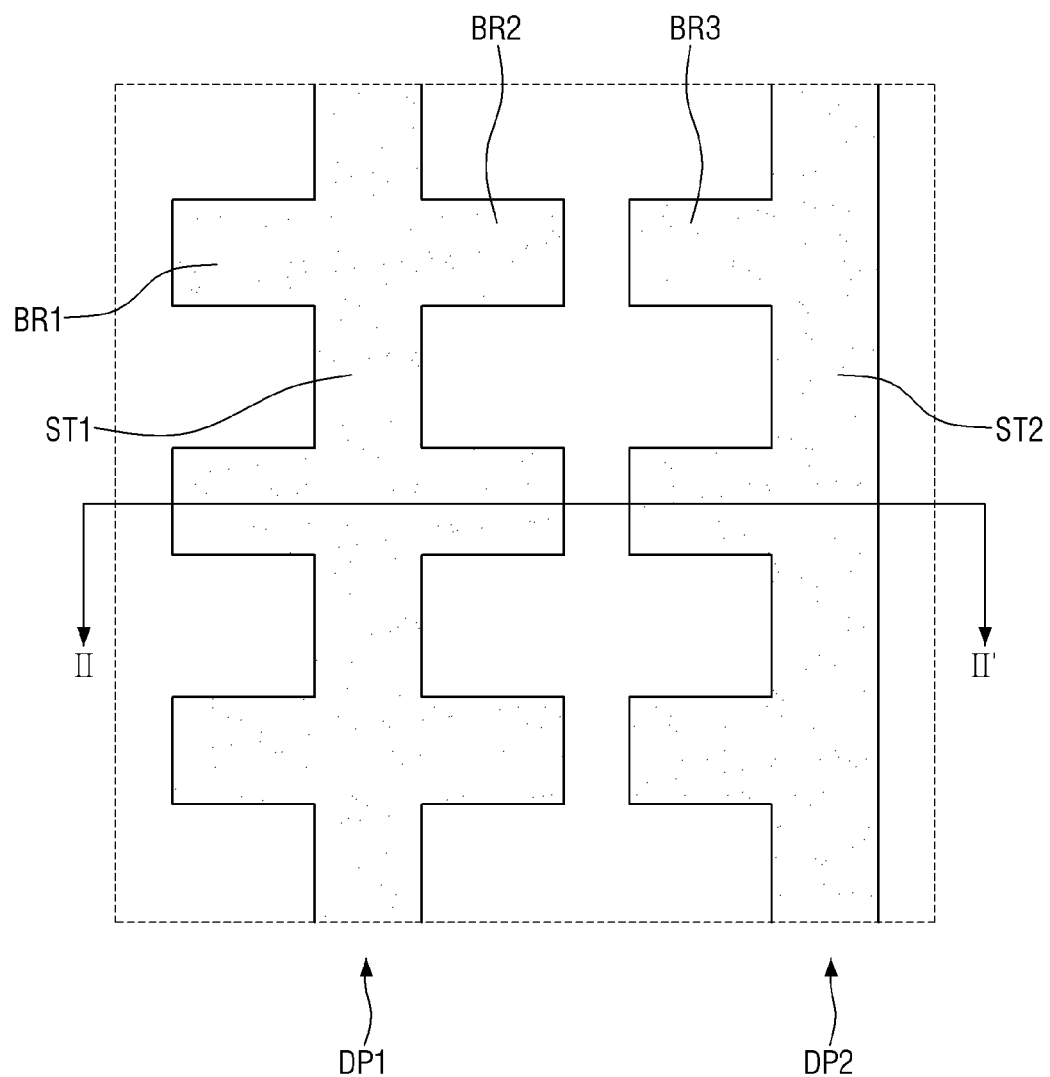
FIG. 4 is an enlarged view of a region "B" of FIG. 1.
Figure 5:
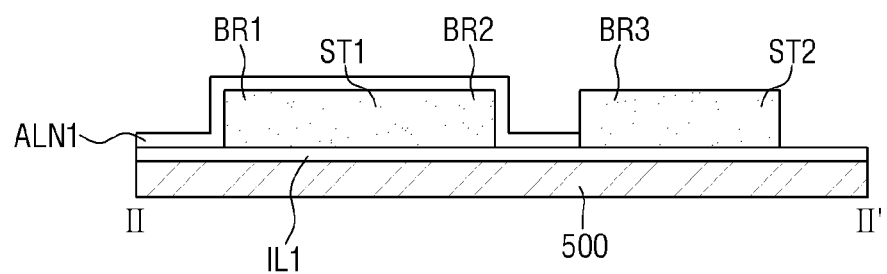
FIG. 5 is a cross-sectional view taken along line II-II' of FIG. 4.

FIG. 1 is a schematic diagram of a display device according to an embodiment of the invention. FIG. 2 is an enlarged view of a region "A" of FIG. 1. FIG. 3 is a cross-sectional view taken along line I-I' of FIG. 2. FIG. 4 is an enlarged view of a region "B" of FIG. 1. FIG. 5 is a cross-sectional view taken along line II-II' of FIG. 4.

Referring to FIGS. 1 to 5, an exemplary embodiment of a display device includes a first substrate 500 on which a display region DA and a non-display region NDA disposed outside the display region DA are defined; a first dam pattern DP1 that includes a first stem section ST1 disposed in the non-display region NDA and extending in a predetermined direction or a first direction of the non-display region NDA, e.g., a Y-direction, and first and second branch sections BR1 and BR2 extending to diverge from the first stem section ST; and a second dam pattern DP2 that includes a second stem section ST2 disposed parallel to the first stem section ST1 and extending in the vertical direction, and a third branch section BR3 extending to diverge from the second stem section ST2 toward the second branch section BR2 and spaced apart from the first branch section. Herein, the predetermined direction may be a direction in which the non-display region NDA expends or a direction perpendicular to a widthwise direction of the non-display region NDA.

The first substrate 500 may include or be formed of a material having heat resistance and permeability. The first substrate 500, for example, may be formed of, but not limited to, a transparent glass or plastic. The display region DA and the non-display region NDA are defined on the first substrate 500.

The display region DA is a region in which an image is displayed in the display device, and the non-display region NDA is a region in which various signal lines are disposed to allow the image to be displayed in the display region DA.

A plurality of data drivers DU and a plurality of fan outlines DFL may be disposed on the non-display region NDA. The plurality of data drivers DU provides data signals to the data line DL, and the plurality of fan outlines transmits the signals provided from the data drivers DU to the data lines DL.

The display region DA will hereinafter be described in greater detail. A plurality of pixels connected to the plurality of data lines DL and the plurality of gate lines GL may be disposed on the display region DA. In an exemplary embodiment, the plurality of pixels may be defined by the plurality of data lines DL and the plurality of gate lines GL. FIG. 2 is an enlarged view of a single pixel (a portion "A" in FIG. 1) among the plurality of pixels, and the display region DA may include a plurality of pixels substantially identical to each other or the single pixel shown in FIG. 2.

The gate wirings GL and GE may be disposed on the first substrate 500. The gate wirings GL and GE may include a gate line GL that transmits a gate signal to a pixel connected thereto, and a gate electrode GE that protrudes from the gate line GL in the form of protrusion. The gate line GL may extend in a second direction. The second direction, for example, may be an X-axis direction of FIG. 2. The gate electrode GE may constitute three terminals of the thin film transistor, together with a source electrode SE and a drain electrode DE to be described later.

The gate wirings GL and GE may include at least one of an aluminum (Al)-based metal including an aluminum alloy, a silver (Ag)-based metal including a silver alloy, a copper (Cu)-based metal including a copper alloy, a molybdenum (Mo)-based metal including a molybdenum alloy, chromium (Cr), titanium (Ti) and tantalum (Ta), for example. However, the materials of the gate wirings GL and GE are not limited thereto, and alternatively, a metal or a polymeric material having characteristics to achieve a desired display device may be utilized as a material of the gate wirings GL and GE.

In an exemplary embodiment, the gate wirings GL and GE may have a single film structure, but not being limited thereto. Alternatively, the gate wirings GL and GE may have a multiple film structure, e.g., a double film structure or a triple film structure, for example.

The gate insulating film GI may be disposed on the gate wirings GL and GE. The gate insulating film GI may cover the gate wirings GL and GE, and may be formed over an entire surface of the first substrate 500.

The gate insulating film GI may be formed using, e.g., by mixing, at least one material selected from an inorganic insulating material such as silicon oxide (SiOx) and silicon nitride (SiNx), and an organic insulating material such as benzocyclobutene ("BCB"), an acrylic based material and a polyimide ("PI"), for example, but not being limited thereto.

A semiconductor pattern layer 700 may be disposed on the gate insulating film GI.

The semiconductor pattern layer 700 may include amorphous silicon or polycrystalline silicon. However, the invention is not limited thereto, and the semiconductor pattern layer 700 may include an oxide semiconductor.

The semiconductor pattern layer 700 may have various shapes such as an island shape and a linear shape. In an exemplary embodiment, where the semiconductor pattern layer 700 has a linear shape, the semiconductor pattern layer 700 may be located below the data line DL and may extend to the top, e.g., an upper surface, of the gate electrode GE.

In an exemplary embodiment, the semiconductor pattern layer 700 may be patterned in the substantially same shape as the data wirings DL, SE, DE and 150 to be described later in regions except for a channel region. In such an embodiment, the semiconductor pattern layer 700 may be disposed to overlap the data wirings DL, SE, DE and 150 in the entire region of the semiconductor pattern layer 700 except for the channel region thereof. The channel region may be disposed between the source electrode SE and the drain electrode DE facing each other. The channel region serves to electrically connect the source electrode SE and the drain electrode DE, and a specific shape thereof is not limited to a specific shape.

An ohmic contact layer (not illustrated) doped with n-type impurities at a high concentration may be disposed over the semiconductor pattern layer 700. The ohmic contact layer may overlap all or a part of the semiconductor pattern layer 700. However, in an embodiment where the semiconductor pattern layer 700 includes an oxide semiconductor, the ohmic contact layer may be omitted.

In an exemplary embodiment, where the semiconductor pattern layer 700 includes an oxide semiconductor, the semiconductor pattern layer 700 may include zinc oxide (ZnO). In an exemplary embodiment, an ion of at least one of gallium (Ga), indium (In), tin (Sn), zirconium (Zr), hafnium (Hf), cadmium (Cd), silver (Ag), copper (Cu), germanium (Ge), gadolinium (Gd), titanium (Ti) and vanadium (V) may be doped on the semiconductor pattern layer 700. In one exemplary embodiment, for example, the semiconductor pattern layer 700 may include at least one oxide semiconductor selected from ZnO, ZnGaO, ZnInO, ZnSnO, GaInZnO, CdO, InO, GaO, SnO, AgO, CuO, GeO, GdO, HfO, TiZnO, InGaZnO and InTiZnO. However, the type of the oxide semiconductor is not limited thereto.

The data wirings DL, SE, DE and 150 may be disposed on the semiconductor pattern layer 700. The data wirings DL, SE, DE and 150 include a data line DL, a source electrode SE, a drain electrode DE and a drain electrode extension 150.

The data line DL may extend in a second direction, e.g., in a Y-axis direction in FIG. 2 to intersect with the gate line GL. The source electrode SE may diverge from the data line DL in the form of branch and may be disposed to extend to the top, e.g., an upper surface, of the semiconductor pattern layer 700.

The drain electrode DE is spaced apart from the source electrode SE, and may be disposed above the semiconductor pattern layer 700 to face the source electrode SE around the gate electrode GE or the channel region. The drain electrode extension 150 may extend from the drain electrode DE and may be integrally formed with the drain electrode DE. The drain electrode extension 150 may have a relatively wider width than the drain electrode DE to further facilitate the electrical contact with the pixel electrode PE. In an alternative exemplary embodiment, the drain electrode extension 150 may be omitted, and the pixel electrode PE may be in direct contact with and electrically connected to the drain electrode DE.

The data wirings DL, SE, DE and 150 may have a single film structure or a multi-film structure and may include nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se) or tantalum (Ta). The data wirings DL, SE, DE and 150 may include an alloy including at least one selected from titanium (Ti), zirconium (Zr), tungsten (w), tantalum (Ta), niobium (Nb), platinum (Pt), hafnium (Hf), oxygen (O) and nitrogen (N), for example. However, the material of the data wirings DL, SE, DE and 150 are not limited thereto.

In an exemplary embodiment, as shown in FIG. 2, a single thin film transistor is disposed in each pixel, but the invention is not limited thereto. In an alternative exemplary embodiment, a plurality of thin film transistors may be disposed in each pixel.

A color filter CF may be disposed over the data wirings DL, SE, DE and 150 and the semiconductor pattern layer 700. The color filter CF may include a plurality of color filters including a blue color filter, a green color filter and a red color filter. In an exemplary embodiment, heights of each of the blue color filter, the green color filter and the red color filter may be different from each other.

A contact hole CNT, through which the drain electrode extension 150 is exposed, may be defined in the color filter CF. The drain electrode extension 150 is exposed by the contact hole CNT, and thus, a pixel electrode PE to be described later may be electrically connected to the drain electrode DE.

The pixel electrode PE may be disposed on the color filter CF. The pixel electrodes PE may be electrically connected to the drain electrode DE through a contact hole CNT defined in the color filter CF.

In an exemplary embodiment, the pixel electrode PE may include or be formed of a transparent conductor such as indium tin oxide ("ITO") or indium zinc oxide ("IZO") or a reflective conductive material such as aluminum, for example.

In an exemplary embodiment, as shown in FIG. 2, the pixel electrodes PE has a flat plate shape, but the shape of the pixel electrode is not limited thereto. In an alternative exemplary embodiment, the pixel electrode may be a structure having one or more slits. In another alternative exemplary embodiment, the pixel electrode may be provided in plural in each pixel, and different voltages may be applied to the pixel electrodes, respectively.

Although it is not illustrated in the drawings, a black matrix may be disposed on the color filter CF and the pixel electrode PE. The black matrix may extend in the first direction to cover the gate line GL or may extend in the second direction to cover the data line DL.

The black matrix may serve to block the light that is incident from the outside. In an exemplary embodiment, the black matrix may include or be formed of a photosensitive resin including a black pigment, for example, to block the light that is incident from the outside. However, the material of the black matrix is not limited thereto, and any substance having physical properties for blocking the light incident from the outside may be used as the black matrix.

In another alternative exemplary embodiment, the black matrix may be disposed on the upper substrate facing the first substrate 500, e.g., on a second substrate 1000 (shown in FIG. 13), instead of the first substrate 500.

The first alignment film ALN1 may be disposed on the first substrate 500 including the plurality of pixels. The first alignment film ALN1 is intended to initially align the liquid crystal layer LC disposed between the first substrate 500 and the second substrate 1000, and may include a polymeric material in which one of decomposition, dimerization and isomerization is performed by the irradiation of light (e.g., ultraviolet ("UV") or laser). In an exemplary embodiment, the first alignment film ALN1 may include or be made of polymer obtained by polymerizing reactive mesogen.

In one exemplary embodiment, for example, the first alignment film ALN1 may include a PI, but the material of the first alignment film ALN1 is not limited thereto.

In an exemplary embodiment, the first alignment film ALN1 may cover the entire region of the display region DA and may be disposed to extend to the non-display region NDA. In such an embodiment, the first alignment film ALN1 may cover the whole of the display region DA and at least a part of the non-display region NDA.

Hereinafter, the non-display region NDA will be described in greater detail.

Referring to FIGS. 4 and 5, the first insulating film IL1 may be disposed in the non-display region NDA of the first substrate 500. The first insulating film IL1, for example, may be formed by mixing any one or one or more selected from an inorganic insulating material such silicon oxide (SiOx) and silicon nitride (SiNx), an organic insulating material such as BCB, an acrylic based material and a PI, but the material of the first insulating film IL1 is not limited thereto.

The first insulating film IL 1 may include or be formed of substantially the same material as the gate insulating film GI of the display region DA. In one exemplary embodiment, for example, the first insulating film IL1 is integrally and simultaneously formed with the gate insulating film GI of the display region DA, but not being limited thereto. In an alternative exemplary embodiment, the first insulating film IL1 may include or be formed of a material different from a material included in the gate insulating film GI.

A first dam pattern DP1 and a second dam pattern DP2 may be disposed on the first insulating film IL1.

The first dam pattern DP1 may be disposed in the non-display region NDA. In one exemplary embodiment, for example, the first dam pattern DP1 may be disposed in the non-display region NDA to extend in the first direction or the vertical direction, e.g., the Y-axis direction as shown in FIG. 1, but the first direction is not limited thereto. In an alternative exemplary embodiment, and the first direction may be the X-axis direction depending on the position of the first dam pattern DP1. In another alternative exemplary embodiment, the first dam pattern DP1 may be bent or curved, or may have a form of a closed curve that surrounds the display region DA. Such embodiments will be described below in greater detail.

The first dam pattern DP1 may be disposed parallel to an outer side of the display region DA. In an exemplary embodiment, the first dam pattern DP1 may be disposed parallel to a boundary between the display region DA and the non-display region NDA. In an exemplary embodiment where the display region DA has a rectangular shape, the first dam pattern DP1 may be disposed along or adjacent to at least one side of four outer sides (which may be a boundary between the display region DA and the non-display region NDA) of the display region DA, and may extend parallel to the at least one side of four outer sides.

The first dam pattern DP1 may include a first stem section ST1, a first branch section BR1 and a second branch section BR2. In one exemplary embodiment, for example, the first stem section ST1 has a bar shape and may extend in the first direction. In an exemplary embodiment where the display region DA has a rectangular shape, the first stem section ST1 may be disposed along or adjacent to at least one side of the four outer sides of the display region DA, and may extend to parallel to the at least one side of four outer sides.

The first branch section BR1 and the second branch section BR2 may extend to diverge from the first stem section ST1.

The first branch section BR1 and the second branch section BR2 may extend in a direction different from the first direction. In an exemplary embodiment, as shown in FIG. 4, the first branch section BR1 extends in the X-axis negative direction and the second branch section BR2 extends in the X-axis positive direction, but the invention is not limited thereto.

In an exemplary embodiment, as shown in FIG. 4, the first stem section ST1 extends in the Y-axis direction, and the first branch section BR1 and the second branch section BR2 diverging from the first stem section ST1 extend in the X-axis direction, but not being limited thereto. In an alternative exemplary embodiment, the first stem section ST1 may extend in the X-axis direction and the first branch section BR1 and the second branch section BR2 diverging from the first stem section ST1 may extend in the Y-axis direction, depending on the position of the first dam pattern DP1. In an exemplary embodiment, as shown in FIG. 4, the first stem section ST1, the first branch section BR1 and the second branch section BR2 are orthogonal to one another, but the embodiment is not limited thereto. In an alternative exemplary embodiment, an angle formed by the extension direction of the first stem section ST1 and the first branch section BR1 and/or the first stem section ST1 and the second branch section BR2 may be an acute angle or an obtuse angle.

In an exemplary embodiment, the first branch section BR1 may diverge from one side of the first stem section ST1, and the second branch section BR2 may diverge from the other side of the first stem section ST2. In such an embodiment, the first branch section BR1 and the second branch section BR2 may diverge in the directions opposite to each other. In such an embodiment, the first branch section BR1 may extend toward the display region DA, and the second branch section BR2 may extend toward the outer edge of the non-display region NDA.

In an exemplary embodiment, as shown in FIG. 4, the first branch section BR1 and the second branch section BR2 extend in the directions opposite to each other, and the first branch section BR1 and the second branch section BR2 are disposed on a same straight imaginary line, that is, linearly aligned with each other. In an alternative exemplary embodiment, the first branch section BR1 and the second branch section BR2 diverge in the directions opposite to each other and intersecting with each other.

In an exemplary embodiment, the first branch section BR1 diverging from the first stem section ST1 may be provided in plural. In such an embodiment, a plurality of first branch sections BR1 may be disposed to be spaced apart from each other at regular or constant intervals.

In an exemplary embodiment, the second branch section BR2 diverging from the first stem section ST1 may be provided in plural. In such an embodiment, a plurality of second branch sections BR2 may be disposed to be spaced apart from each other at regular or constant intervals.

The second dam pattern DP2 may be disposed along or adjacent to the first dam pattern DP1. The second dam pattern DP2 may include the second stem section ST2 and the third branch section BR3.

The second stem section ST2 has a bar shape and may extend in the first direction. The second stem section ST2 may be disposed parallel to the first stem section ST1. In an exemplary embodiment, the first stem section ST1 and the second stem section ST2 may extend parallel to each other, while being spaced apart from each other at regular or regular or constant intervals. In an exemplary embodiment where the display region DA has a rectangular shape, the second stem section ST2 may be disposed along or adjacent to at least one side of the four sides of the display region DA, and may be disposed parallel to the at least one side of the four sides.

The third branch section BR3 may extend to diverge from the second stem section ST2. In an exemplary embodiment, the third branch section BR3 may extend from one side of the second stem section ST2. In such an embodiment, the third branch section BR3 may extend toward the display region DA.

The third branch section BR3 may extend in a direction different from the first or vertical direction. In an exemplary embodiment, as shown in FIG. 4, the third branch section BR3 extends in the X-axis direction, but the invention is not limited thereto. In an exemplary embodiment, as shown in FIG. 4, the second stem section ST2 extends in the Y-axis direction, and the third branch section BR3 diverging from the second stem section ST2 extends in the X-axis direction, but not being limited thereto. In an alternative exemplary embodiment, the second stem section ST2 may extend in the X-axis direction, and the third branch section BR3 diverging from the second stem section ST2 may extend in the Y-axis direction, depending on the position of the second dam pattern DP2. In an exemplary embodiment, as shown in FIG. 4 the second stem section ST2 and the third branch section BR3 are orthogonal to each other, but not being limited thereto. In an alternative exemplary embodiment, the angle formed by the extension direction of the second stem section ST2 and the third branch section BR3 may be an acute angle or an obtuse angle.

In an exemplary embodiment, the third branch section BR3 diverging from the second stem section ST2 may be provided in plural. In such an embodiment, a plurality of third branch sections BR3 may be disposed to be spaced apart from each other at regular or constant intervals.

In an exemplary embodiment, the second branch section BR2 of the first dam pattern DP1 and the third branch section BR3 of the second dam pattern DP2 may be spaced from each other at regular or constant intervals. In such an embodiment, a distance between the second branch section BR2 and the first third branch section BR3 facing each other may be constant. In such an embodiment, the first alignment film ALN1 flowing toward the non-display region NDA may be stored in a space defined between the second branch section BR2 and the first third branch section BR3 during application of the first alignment film ALN1 to the display region DA, thereby effectively preventing the first alignment film ALN1 from overflowing.

In an exemplary embodiment, the second branch section BR2 and the third branch section BR3 may be disposed to face each other. In such an embodiment, the second branch section BR2 and the third branch section BR3 may be disposed between the first stem section ST1 and the second stem section ST2. In an exemplary embodiment, as illustrated in FIG. 4, the second branch section BR2 and the third branch section BR3 may be placed on a same imaginary straight line. In such an embodiment, the second branch section BR2 and the third branch section BR3 may linearly aligned with each other.

In an exemplary embodiment, the first dam pattern DP1 and the second dam pattern DP2 may include or be made of substantially the same material as the color filter CF of the display region DA. In one exemplary embodiment, for example, the first dam pattern DP1 and the second dam pattern DP2 may be provided by a method for substantially simultaneously forming the color filter CF of the display region DA and the first and the second dam patterns DP1 and DP2 of the non-display region NDA using a same material. However, the invention is not limited by such a manufacturing method, and alternatively, the color filter CF of the display region DA and the first and the second dam patterns DP1 and DP2 of the non-display region NDA may be independently formed by separate processes.

In an exemplary embodiment, the first and the second dam patterns DP1 and DP2 may include or be formed of substantially the same material as the blue color filter CF to ensure a sufficient height for the first and the second dam patterns DP1 and DP2 to effectively perform functions thereof.

In an exemplary embodiment, the height of the first dam pattern DP1 and the second dam pattern DP2 may be substantially the same as each other. In such an embodiment, the first dam pattern DP1 and the second dam pattern DP2 may be formed using a same material and by simultaneously patterning a layer formed by the same material, but the structures of the first and the second dam patterns DP1 and DP2 are not limited by such methods.

In an alternative exemplary embodiment, the first dam pattern DP1 and the second dam pattern DP2 may include or be made of materials different from each other, and the heights of the first dam pattern DP1 and the second dam pattern DP2 may be different from each other.

Referring to FIG. 5, the first alignment film ALN1 may be disposed on the first insulating film IL1 and the first and the second dam patterns DP1 and DP2. The first alignment film ALN1 may at least partially cover the first and second dam patterns DP1 and DP2. In such an embodiment, the first alignment film ALN1 may at least partially overlap the first and the second dam patterns DP1 and DP2. In an exemplary embodiment, as shown in FIG. 5, the first alignment film ALN1 may overlap the first dam pattern DP1 and may not overlap the second dam pattern DP2 when viewed from a plan view in the thickness direction of the display device. Such a structure may be provided by flowing of a part of the first alignment film ALN1 to the non-display region NDA in the process of applying the first alignment film ALN1 to the display region DA. In such an embodiment, as illustrated in FIG. 5, the first alignment film ALN1 may overlap the first stem section ST1, the first branch section BR1 and the second branch section BR2 of the first dam pattern DP1. In such an embodiment, the first dam pattern DP1 may completely overlap the first alignment film ALN1. In such an embodiment, the first alignment film ALN1 may cover the separation space disposed between the second branch section BR2 and the third branch section BR3. One end of the first alignment film ALN1 may be in contact with the side wall of the third branch section BR3 or the side wall of the second stem section ST2.

In an alternative exemplary embodiment, the first dam pattern DP1 may partially overlap the first alignment film ALN1. In one exemplary embodiment, for example, the first alignment film ALN1 may cover only the first stem section ST1, may cover only some of the first stem section ST1, the first branch section BR1 and the second branch section BR2 or may cover only a part of the space between the second branch section BR2 and the third branch section BR3.

In a process of applying the first alignment film ALN1 in the display region DA, a part of the first alignment film ALN1 may flow into the non-display region NDA. In such a process, when the first alignment film ALN1 flows into a seal pattern SLP to be described later, the adhesion performance of the seal pattern SLP may be reduced. When the area of the non-display region NDA is sufficient, there is a limit in the extent that the first alignment film ALN1 flows determined based on the viscosity thereof, and in such a case, the possibility of an occurrence of such a problem is substantially low. However, in a display device having thin bezel, where the area of the non-display region NDA is substantially small, it is desired to cut off the inflow of the alignment film ALN1.

In an exemplary embodiment, where the first dam pattern DP1 and the second dam pattern DP2 are provided as described above, it is possible to effectively prevent the first alignment film ALN1 from completely overlapping the seal pattern SLP of the non-display region NDA, when applying the first alignment film ALN1 to the display region DA. In such an embodiment, the first branch section BR1 reduces the kinetic energy of the first alignment film ALN1 not to go beyond the first dam pattern DP1, and even when the first alignment film ALN1 goes beyond the first dam pattern DP1, the kinetic energy of the first alignment film ALN1 is dispersed by the second branch section BR2 and the third branch section BR3 disposed between the first stem section ST1 and the second stem section ST2, and the space disposed between the second branch section BR2 and the third branch section BR3 receives a part of the first alignment film ALN1, thereby effectively preventing the first alignment film ALN1 from completely going beyond the second dam pattern DP2. Thus, in such an embodiment, the first alignment film ALN1 may be effectively prevented from overlapping the seal pattern SLP to be described later to improve the adhesion performance of the seal pattern SLP. In such an embodiment, a display device having narrow bezel may be effectively achieved by providing such a dam pattern described herein.

Hereinafter, alternative exemplary embodiments of a display device according to the invention will be described. In the following embodiments, the same configuration as the above-described configuration will be denoted by the same reference numbers, and any repetitive detailed description thereof will be omitted or simplified.

Figure 6:
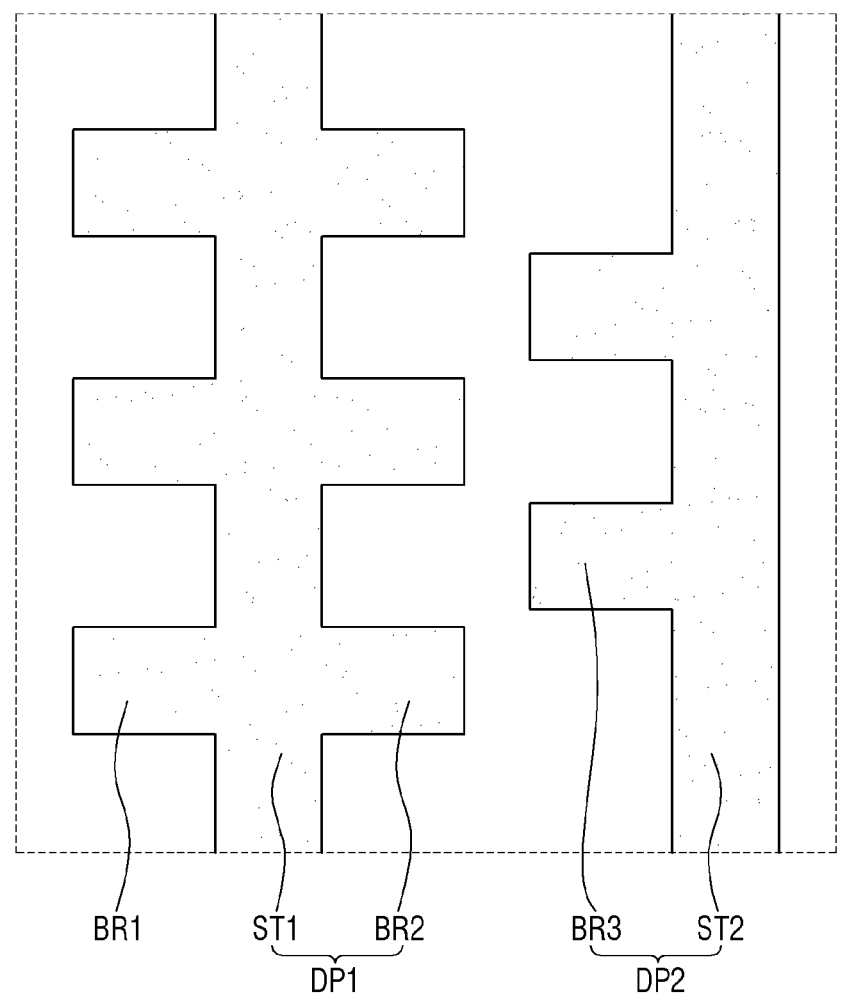
FIG. 6 is an enlarged view of a display device according to an alternative embodiment of the invention.

FIG. 6 is an enlarged view of a display device according to an alternative embodiment of the invention. Referring to FIG. 6, in an exemplary embodiment of the display device, the second branch section BR2 and the third branch section BR3 are alternately disposed to intersect with each other.

The second branch section BR2 and the third branch section BR3 may be disposed to intersect with each other. In such an embodiment, the second branch section BR2 and the third branch section BR3 may be alternately disposed with each other in a space between the first stem section ST1 and the second stem section ST2. In such an embodiment, the second branch section BR2 and the third branch section BR3 may be disposed to intersect with each other along the Y-axis direction.

In such an embodiment, as shown in FIG. 6, the second branch section BR2 and the third branch section BR3 may not overlap or may only partially overlap each other along the X-axis direction.

In such an embodiment, where the second branch section BR2 and the third branch section BR3 are disposed to intersect with each other, the kinetic energy of the first alignment films ALN1 applied to the display region DA and introduced into the non-display region NDA is dispersed to effectively prevent the first alignment film ALN1 from going beyond the second dam pattern DP2.

Figure 7:
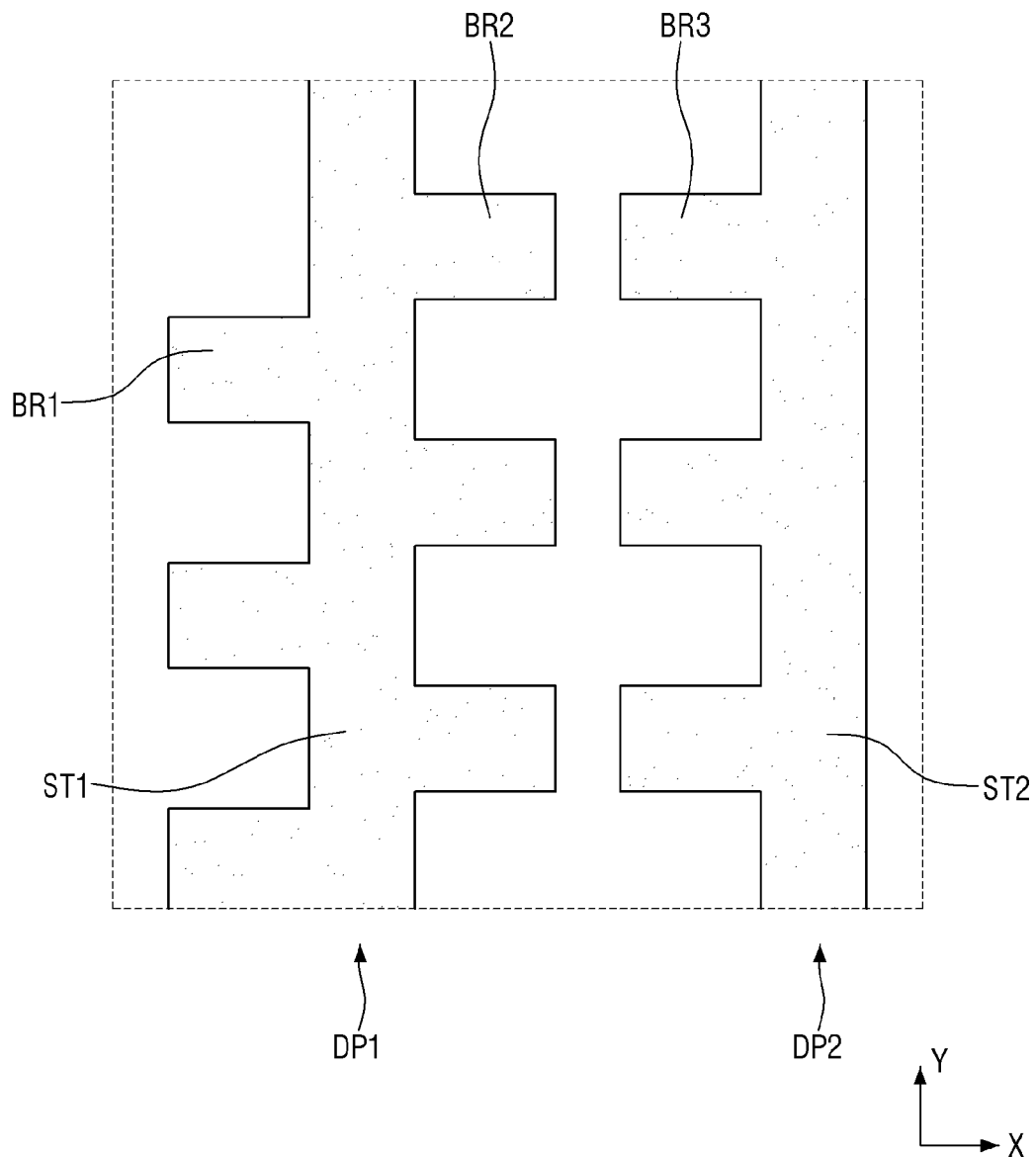
FIG. 7 is a partially enlarged view of a display device according to another alternative embodiment of the invention.

FIG. 7 is a partially enlarged view of a display device according to another alternative embodiment of the invention. Referring to FIG. 7, in an exemplary embodiment of the display device, the first branch section BR1 and the second branch section BR2 are disposed to intersect with each other.

In such an embodiment, the first branch section BR1 extends to diverge from one side of the first stem section ST1, and the second branch section BR2 may extend to diverge from the other side of the first stem section ST1. In such an embodiment, the first branch section BR1 second branch section BR2 may be alternately disposed to intersect with each other.

In such an embodiment, the first branch section BR1 and the second branch section BR2 may be alternately diverged from each other along one direction.

In such an embodiment, as shown in FIG. 7, the first branch section BR1 and the second branch section BR2 may not overlap or only partially overlap each other in X-axis direction.

Figure 8:
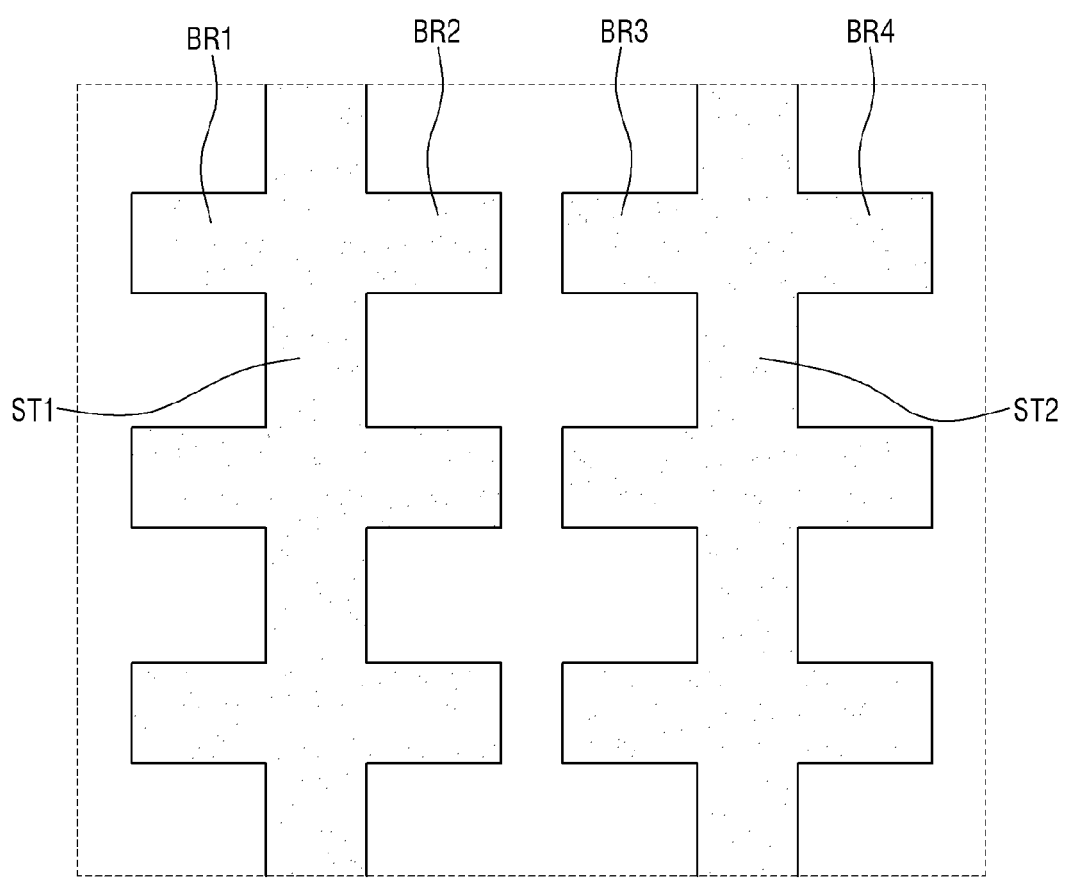
FIG. 8 is an enlarged view of the display device according to another alternative embodiment of the invention.

FIG. 8 is an enlarged view of a display device according to another alternative embodiment of the invention. Referring to FIG. 8, in an exemplary embodiment of the display device, the second dam pattern DP2 may further include a fourth branch section BR4 extending by diverging from the other side of the second stem section ST2.

In such an embodiment, the fourth branch section BR4 may extend by diverging from the other side of the second stem section ST2. The fourth branch section BR4 may extend toward the outside edge of the non-display region NDA. In such an embodiment, as shown in FIG. 8, the fourth branch section BR4 is disposed in alignment with the third branch section BR3 on a same straight imaginary line, but the position of the fourth branch section BR4 is not limited thereto. Alternatively, the first fourth branch section BR4 may be alternately disposed to intersect with the third branch section BR3.

Figure 9:
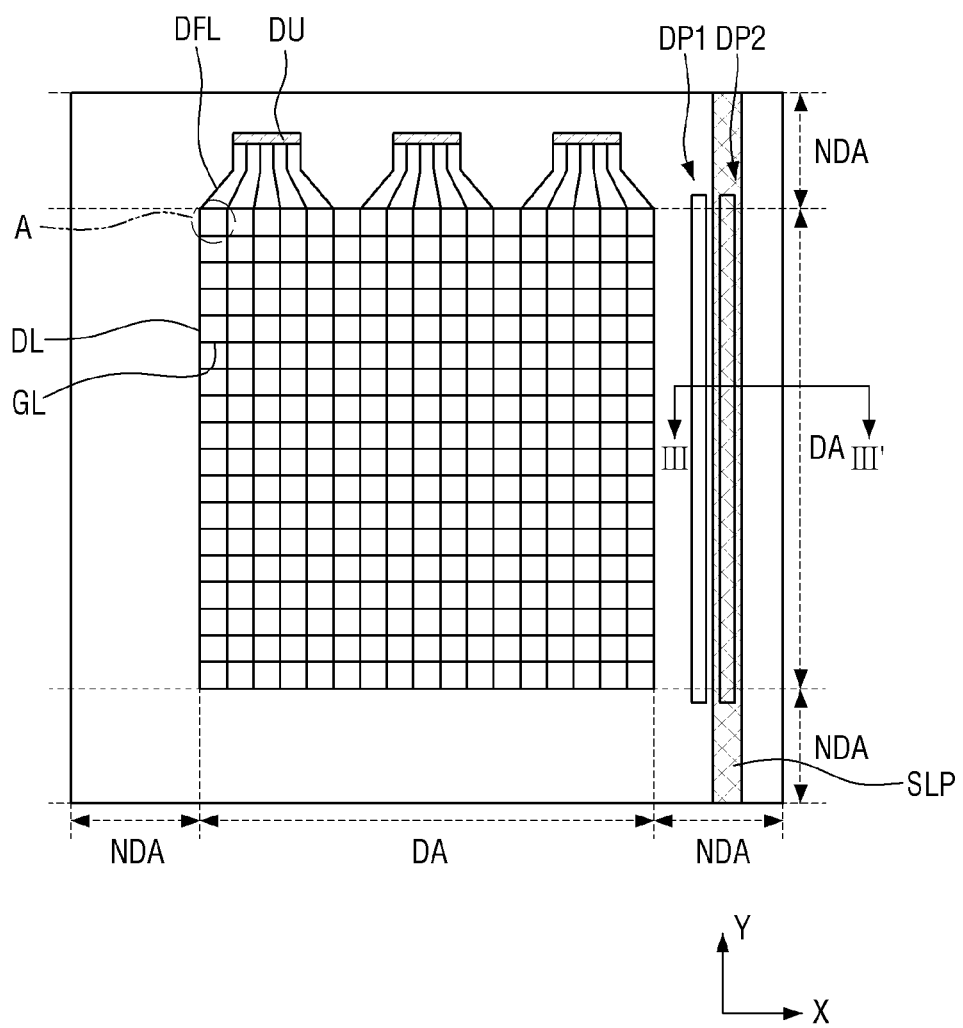
FIG. 9 is a schematic diagram of the display device according to another alternative embodiment of the invention.
Figure 10:
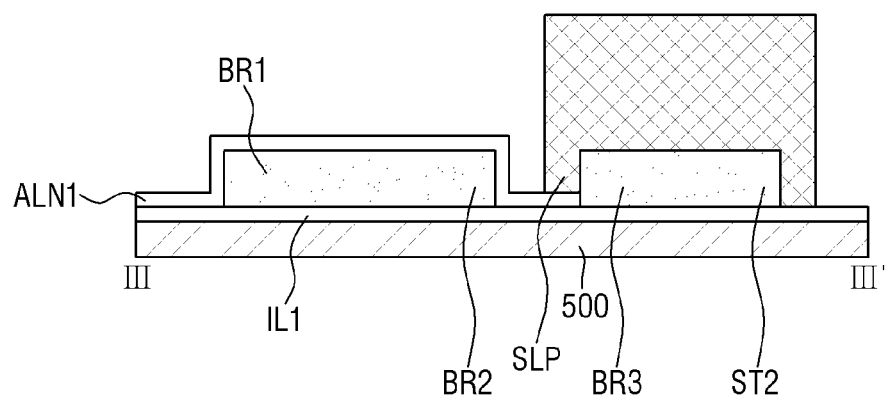
FIG. 10 is a cross-sectional view taken along line III-III' of FIG. 8.

FIG. 9 is a schematic diagram of a display device according to another alternative embodiment of the invention. FIG. 10 is a cross-sectional view taken along line III-III' of FIG. 9. Referring to FIGS. 9 and 10, an exemplary embodiment of the display device may further include a seal pattern SLP disposed along at least one side of the non-display region NDA.

The seal pattern SLP may be disposed along at least one side of the non-display region NDA. The seal pattern SLP may serve to bond the first substrate 500 and a second substrate 1000 to be described later. In an exemplary embodiment, the seal pattern SLP may connect the first substrate 500 and the second substrate 1000.

In an exemplary embodiment, the seal pattern SLP may at least partially overlap the second dam pattern DP2. In such an embodiment, the seal pattern SLP may overlap all or a part of the second stem section ST2 and the third branch section BR3 of the second dam pattern DP2. In one exemplary embodiment, for example, the seal pattern SLP may completely cover the second stem section ST2 and the third branch section BR3, may completely cover the second stem section ST2 and partially cover the third branch section BR3, or may cover only a part of the second stem section ST2. In an exemplary embodiment, where the second dam pattern DP2 includes the first fourth branch section BR4, the seal pattern SLP may completely cover the fourth branch section BR4.

The seal pattern SLP may be located outside the first dam pattern DP1 or may not overlap the first dam pattern DP1 when viewed from a plan view in the thickness direction. In such an embodiment, the first dam pattern DP1 may be disposed between the display region DA and the seal pattern SLP.

In an exemplary embodiment, as shown in FIG. 10, the lower end of the seal pattern SLP may at least partially overlap the first alignment film ALN1, the second dam pattern DP2 and the first insulating film IL1. If a half or more of the lower end area of the seal pattern SLP overlaps the first alignment film ALN1, the adhesive performance of the seal pattern SLP may be significantly lowered. In an exemplary embodiment, an area overlapping or being in contact with the first alignment film ALN1 at the lower end of the seal pattern SLP 1 may be equal to or less than a half of the lower end area of the seal pattern SLP such that the seal pattern SLP maintains the adhesive performance effective for bonding the first substrate 500 and the second substrate 1000. In such an embodiment, the area in which the seal pattern SLP and the first alignment film ALN1 are in contact with each other is equal to or less than a value obtained by dividing the lower end area of the seal pattern SLP by 2.

In such an embodiment, where the seal pattern SLP at least partially overlaps the second dam pattern DP2, an area used to bond the first substrate 500 and the second substrate 1000 may be reduced, and thus, a display device having thin bezel may be effectively achieved.

Figure 11:
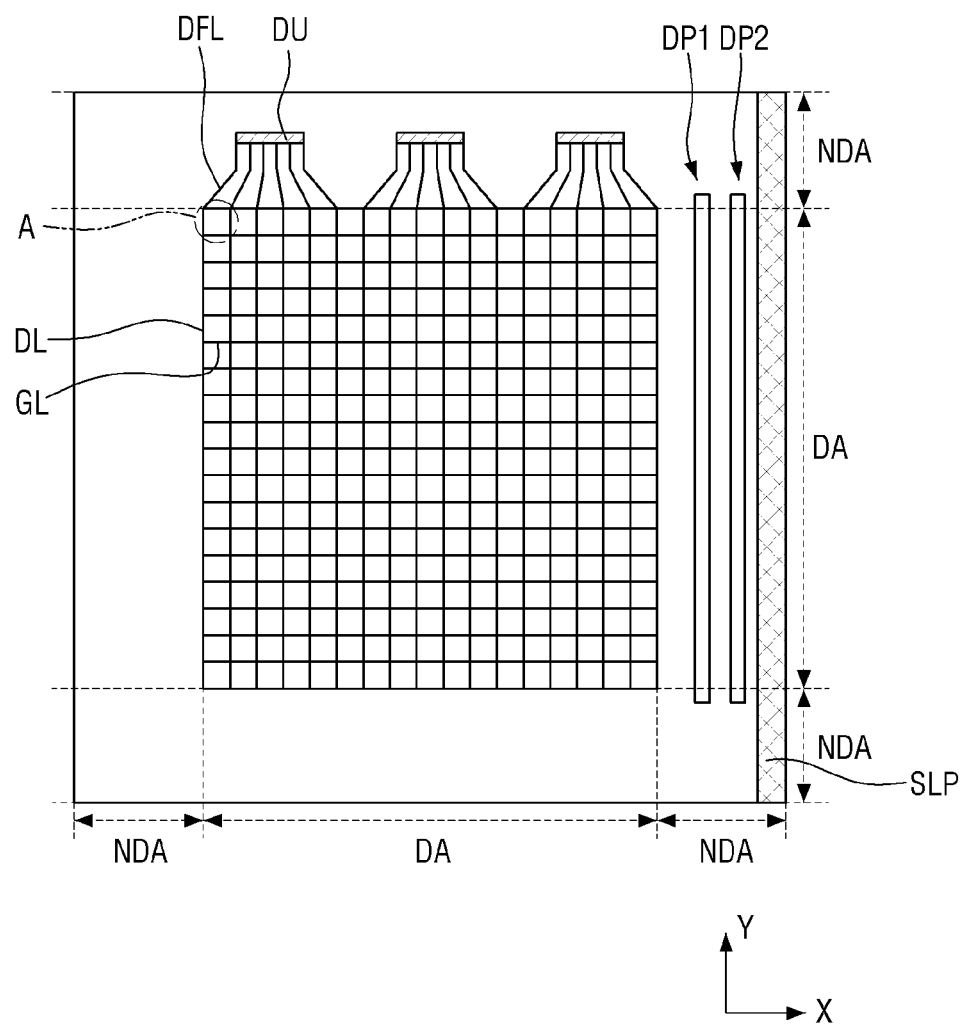
FIG. 11 is a schematic diagram of a display device according to another alternative embodiment of the invention.

FIG. 11 is a schematic diagram of a display device according to another alternative embodiment of the invention. Referring to FIG. 11, in an exemplary embodiment of the display device, the seal pattern SLP may be disposed outside the second dam pattern DP2.

The seal pattern SLP may be located outside the second dam pattern DP2. In such an embodiment, the seal pattern SLP may not overlap the second dam pattern DP2. When the seal pattern SLP is disposed outside the second dam pattern DP2, the seal pattern SLP may not overlap the first alignment film ALN1. In such an embodiment, the adhesion performance of the seal pattern SLP may be improved as compared to a case where the seal pattern SLP overlaps the first alignment film ALN1.

Figure 12:
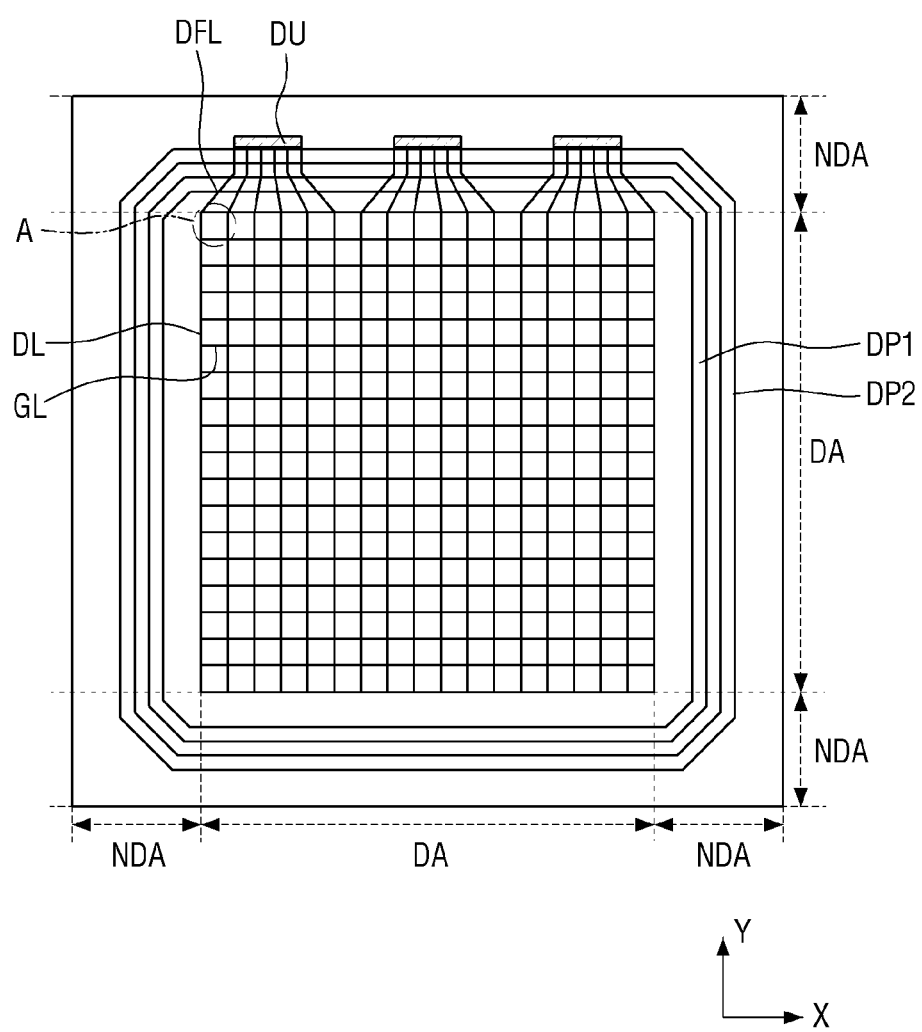
FIG. 12 is a schematic diagram of a display device according to another alternative embodiment of the invention.

FIG. 12 is a schematic diagram of a display device according to another alternative embodiment of the invention.

Referring to FIG. 12, in an exemplary embodiment of the display device, the first dam pattern DP1 and the second dam pattern DP2 are disposed to surround the outer circumference of the display region DA. In such an embodiment, as described above, the first dam pattern DP1 and the second dam pattern DP2 may be disposed on at least one side of the non-display region NDA. In an exemplary embodiment where the display region DA has a rectangular shape, the first dam pattern DP1 and the second dam pattern DP2 may be disposed along or adjacent to at least one of the four sides that form the outer circumference of the display region DA. In such an embodiment, the dam pattern DA may be disposed along or adjacent to the two or more different sides that form the outer circumference of the display region DA.

In an exemplary embodiment, the first dam pattern DP1 and the second dam pattern DP2 may be disposed along or adjacent to four sides that forms the outer circumference of the display region DA. In such an embodiment, the first dam pattern DP1 and the second dam pattern DP2 may have a closed polygonal shape, and the display region DA may be disposed within a closed space defined or partitioned by the first dam pattern DP1.

In such an embodiment, the first dam pattern DP1 is disposed to surround the four sides that form the outer circumference of the display region DA, and the second dam pattern DP2 is disposed outside the first dam pattern DP1 and may be disposed to surround the outer circumference of the first dam pattern DP1.

In an exemplary embodiment, the first dam pattern DP1 and/or second dam pattern DP2 may have, but not limited to, a rectangular shape. In an exemplary embodiment, the first dam pattern DP1 and/or the second dam pattern DP2 may have a shape in which corner portions diagonally extend as illustrated in FIG. 11. In such an embodiment, the first dam pattern DP1 and the second dam pattern DP2 adjacent to the corner portion of the display region DA may extend in a direction inclined from the X-axis direction or the Y-axis direction at a predetermined angle. When the first dam pattern DP1 and the second dam pattern DP2 adjacent to the corner portion of the display region DA extend in the diagonal direction, area of the non-display region NDA adjacent to the corner portion of the display region DA may be reduced. Thus, in such an embodiment, a display device having thin bezel may be effectively achieved by reducing the area occupied by the non-display region NDA in the entire display device DA.

Figure 13:
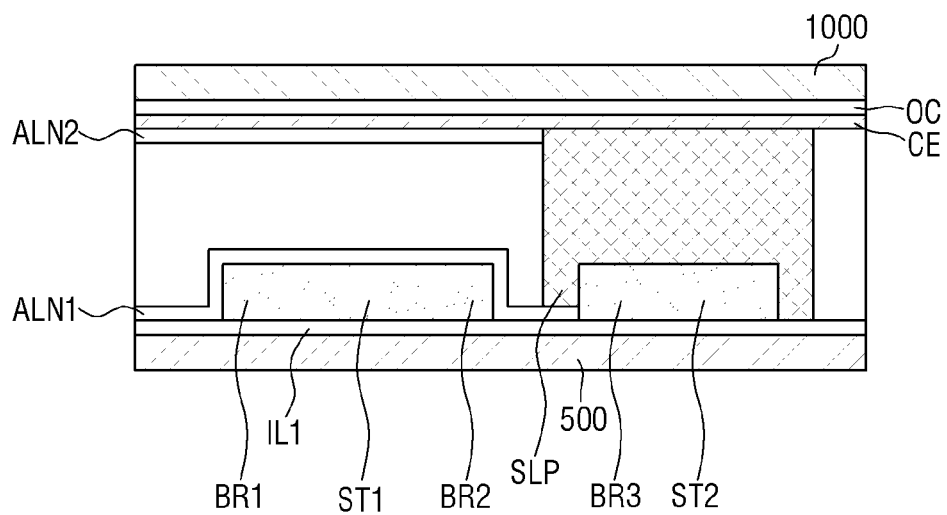
FIG. 13 is a cross-sectional view of a display device according to another alternative embodiment of the invention.

FIG. 13 is a cross-sectional view of a display device according to another alternative embodiment of the invention.

Referring to FIG. 13, an exemplary embodiment of the display device may further include a second substrate 1000 that faces the first substrate 500.

The second substrate 1000 may be disposed to face the first substrate 500.

The second substrate 1000 may include or be formed of a material having heat resistance and permeability. The second substrate 1000, for example, may include or be formed of, but not limited to, a transparent glass or plastic.

An overcoat film OC may be disposed on the second substrate 1000. The overcoat film OC may include an organic or inorganic insulating material. The overcoat film OC may be disposed over the entire region of the second substrate 1000, and may function as a planarization film.

A common electrode CE may be disposed on the overcoat film OC. The common electrode CE may be a plate-like electrode that is not patterned. The common voltage may be applied to the common electrode CE. When the different voltages are applied to the common electrode CE and the pixel electrode PE, an electric field is generated between the common electrode CE and the pixel electrode PE to control the movement of the liquid crystal disposed between the substrate 500 and the second substrate 1000.

A second alignment film ALN2 may be disposed on the common electrode CE.

The second alignment film ALN2 initially aligns the liquid crystal layer LC disposed between the first substrate 500 and the second substrate 1000, and may include a polymeric material in which one of decomposition, dimerization and isomerization is performed by the irradiation of light (e.g., UV or laser). In an exemplary embodiment, the first alignment film ALN1 may include or be made of polymer obtained by polymerizing reactive mesogen.

In an exemplary embodiment, the second alignment film ALN2, for example, may include a PI.

The second alignment film ALN2 may at least partially cover the common electrode CE.

In an exemplary embodiment, as described above, the first substrate 500 and the second substrate 1000 may be connected to each other by a seal pattern SLP. In such an embodiment, the upper end of the seal pattern SLP may at least partially overlap the common electrode CE and the second alignment film ALN2. In an alternative exemplary embodiment, the upper end of the seal pattern SLP is in contact only with the common electrode CE and may not be in contact with the second alignment film ALN2.

Hereinafter, an exemplary embodiment of a method for manufacturing a display device will be described. Some of the configurations described below may be the same as those of the exemplary embodiments of the display device described above with reference to FIGS. 1 to 13, and any repetitive detailed description thereof may be omitted.

FIGS. 14 to 18 are cross-sectional views for explaining a method for manufacturing a display device, according to an embodiment of the invention.

Referring to FIGS. 14 to 18, an exemplary embodiment of the method for manufacturing the display includes preparing a first substrate 500 on which a display region DA and a non-display region NDA disposed outside the display region DA are defined; and providing, e.g., forming, a first dam pattern DP1 and a second dam pattern DP2 on or above the first substrate 500 in the non-display region NDA, where the first dam pattern DP1 includes a first stem section ST1 extending in a vertical direction in the non-display region NDA, and a first branch section BR1 and a second branch section BR2 extending to diverge from the first stem section ST1, and the second dam pattern DP2 includes a second stem section ST2 disposed parallel to the first stem section ST1 in the non-display region NDA and a third branch section extending to diverge from the second stem section ST2 and facing the second branch section BR2.

Figure 14:
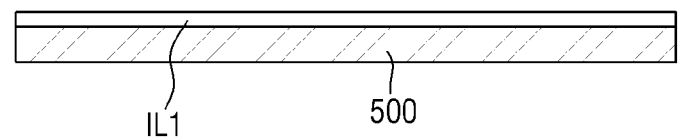
FIGS. 14 to 18 are cross-sectional views for explaining a method for manufacturing a display device, according to an embodiment of the invention.

In an exemplary embodiment, referring to FIG. 14, the process of preparing the first substrate 500 on which the display region DA and the non-display region NDA are defined is performed. The display region DA and the non-display region NDA may be substantially identical to those of the exemplary embodiments of the display device described above. Therefore, any repetitive detailed description thereof will be omitted.

In such an embodiment, the first insulating film IL1 may be provided on the first substrate 500. The first insulating film IL1, for example, may be formed by a chemical vapor deposition or a physical coating method. However, the method for forming the first insulating film IL1 is not limited thereto.

Figure 15:
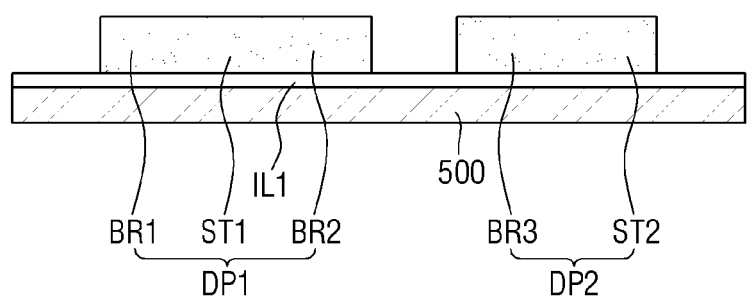

In such an embodiment, referring to FIG. 15, a process of providing the first dam pattern DP1 and the second dam pattern DP2 on the first insulating film IL1 is performed. Formation of the first dam pattern DP1 and the second dam pattern DP2 may include providing one or more films on the first insulating film IL1 and patterning the films to form the first dam pattern DP1 and the second dam pattern DP2. In such an embodiment, as described above, the first dam pattern DP1 and the second dam pattern DP2 may include or be formed of substantially the same material as the color filter of the display region DA CF. In an exemplary embodiment, the first dam pattern DP1 and the second dam pattern DP2 may be simultaneously formed with the color filter CF of the display region DA. In one exemplary embodiment, for example, the first dam pattern DP1 and the second dam pattern DP2 may be formed substantially simultaneously with a blue color filter of the display region DA.

The specific shapes of the first dam pattern DP1 and the second dam pattern DP2 may be substantially identical to those of the exemplary embodiments of the display device described above. Therefore, any repetitive detailed description thereof will be omitted here.

Figure 16:
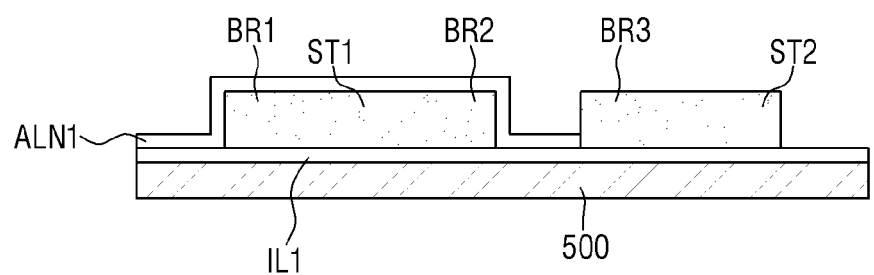

In such an embodiment, referring to FIG. 16, a process of providing the first alignment film ALN1 on the dam pattern DP to at least partially cover the dam pattern DP may be performed.

In such an embodiment, as described above, in the process of providing the first alignment film ALN1 in the display region DA, a part of the first alignment film ALN1 may flow into the non-display region NDA. In such an embodiment, as described in FIG. 5, the first alignment film ALN1 may overlap the first stem section ST1, the first branch section BR1 and the second branch section BR2 of the first dam pattern DP1. In such an embodiment, the first dam pattern DP1 may completely overlap the first alignment film ALN1. In such an embodiment, the first alignment film ALN1 may cover the separation space between the second branch section BR2 and the third branch section BR3. In such an embodiment, the one end of the first alignment film ALN1 may be in contact with the side wall of the third branch section BR3 and the side wall of the second stem section ST2.

In an alternative exemplary embodiment, the first dam pattern DP1 may partially overlap the first alignment film ALN1. In one exemplary embodiment, for example, the first alignment film ALN1 may cover only the first stem section ST1, may cover only some of the first stem section ST1, the first branch section BR1 and the second branch section BR2 or may cover only a part of the separation space between the second branch section BR2 and the third branch section BR3.

Figure 17:
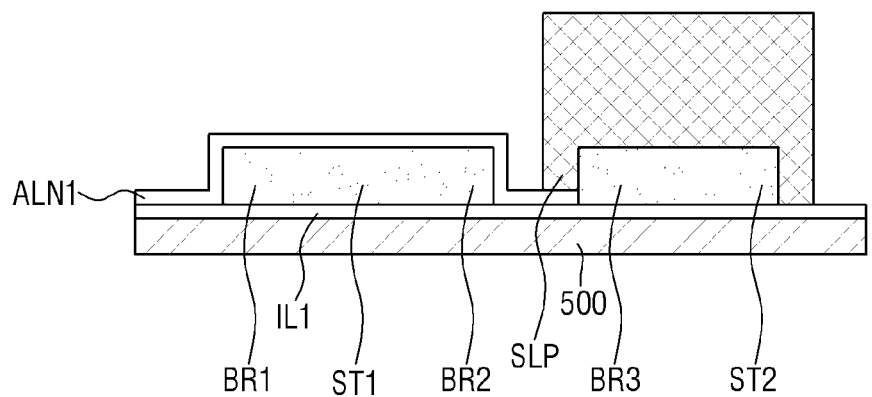

In such an embodiment, referring to FIG. 17, a process of providing the seal pattern SLP on the second dam pattern DP2 may be performed. The seal pattern SLP may at least partially overlap the second dam pattern DP2 as described in FIG. 8 or may be disposed outside the second dam pattern DP2 as described in FIG. 10. In an exemplary embodiment, where the seal pattern SLP is disposed to at least partially overlap the second dam pattern DP2, a part of the lower end of the seal pattern SLP may overlap the first alignment film ALN1, as described above.

Figure 18:
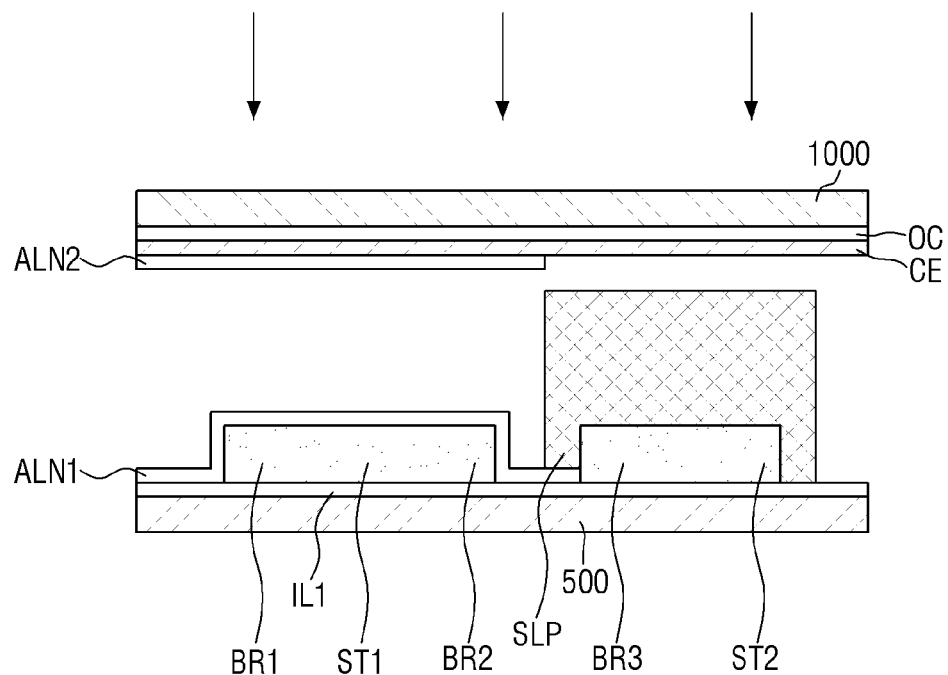

In such an embodiment, referring to FIG. 18, a process of bonding the second substrate 1000 to the first substrate 500 to face each other may be further performed. In such an embodiment, the second substrate 1000 may be substantially identical to that described with reference to FIG. 13, and any repetitive detailed description thereof will be omitted. In such an embodiment, after disposing the first substrate 500 and the second substrate 1000 to face with each other, the first substrate 500 and the second substrate 1000 may be connected to each other via the seal pattern SLP disposed therebetween.

However, the features of the exemplary embodiments of the invention are not restricted to those set forth herein. The above and other features of the exemplary embodiments of the invention will become more apparent to one of daily skill in the art to which the invention pertains by referencing the claims.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device comprising:
 a first substrate, on which a display region and a non-display region disposed outside the display region are defined;
 a first dam pattern disposed on the first substrate in the non-display region, wherein the first dam pattern comprises: a first stem section extending in a predetermined direction; a first branch section extending to diverge from the first stem section; and a second branch section extending to diverge from the first stem section; and
 a second dam pattern disposed on the first substrate in the non-display region, wherein the second dam pattern comprises a second stem section disposed parallel to the first stem section; and a third branch section extending to diverge from the second stem section and facing the second branch section.

2. The display device of claim 1, wherein the first branch section and the second branch section extend in a direction perpendicular to the predetermined direction.

3. The display device of claim 1, wherein the first branch section and the second branch section are alternately disposed with each other along the predetermined direction.

4. The display device of claim 1, further comprising:
 a first alignment film disposed on the first dam pattern, wherein the first alignment film at least partially overlaps the first dam pattern.

5. The display device of claim 4, wherein the first alignment film overlaps the first stem section, the first branch section and the second branch section.

6. The display device of claim 4, wherein
 a space is defined between the second branch section and the third branch section, and
 the first alignment film covers at least a part of the space.

7. The display device of claim 1, further comprising:
 a seal pattern disposed in the non-display region.

8. The display device of claim 7, wherein the seal pattern at least partially overlaps the second dam pattern.

9. The display device of claim 8, wherein the seal pattern completely covers the second stem section and the third branch section.

10. The display device of claim 7, further comprising:
 a first alignment film disposed on the first dam pattern, wherein a part of a lower surface of the seal pattern contacts the first alignment film.

11. The display device of claim 10, wherein an area of the part of the lower surface of the seal pattern in contact with the first alignment film is smaller than about a half of an entire area of the lower surface of the seal pattern.

12. The display device of claim 7, wherein the second dam pattern is disposed between the seal pattern and the display region.

13. The display device of claim 1, wherein
the display region has a rectangular outer circumference, and
the first dam pattern and the second dam pattern are disposed adjacent to at least one of the four outer sides of the outer circumference of the display region.

14. The display device of claim 1, wherein the second stem section and the third stem section are linearly aligned with each other.

15. The display device of claim 1, wherein the second dam pattern further comprises:
a fourth stem section which extends to diverge from the second stem section.

16. The display device of claim 15, wherein the third stem section and the fourth stem section are linearly aligned with each other.

17. A method for manufacturing a display device, the method comprising:
preparing a first substrate in which a display region and a non-display region disposed outside the display region are defined; and
providing a first dam pattern and a second dam pattern on the first substrate in the non-display region,
wherein the first damp pattern comprises:
a first stem section extending in a predetermined direction;
a first branch section extending to diverge from the first stem section; and
a second branch section extending to diverge from the first stem section, and
wherein the second dam pattern comprises:
a second stem section disposed parallel to the first stem section; and
a third branch section extending to diverge from the second stem section and facing the second branch section.

18. The method of claim 17, further comprising:
providing a first alignment film on the first dam pattern to at least partially overlap the first dam pattern.

19. The display device of claim 17, further comprising:
providing a seal pattern on the second dam pattern to at least partially overlap the second dam pattern.

* * * * *